United States Patent
Stearns et al.

(10) Patent No.: US 7,227,149 B2
(45) Date of Patent: Jun. 5, 2007

(54) METHOD AND SYSTEM FOR POSITRON EMISSION TOMOGRAPHY IMAGE RECONSTRUCTION

(75) Inventors: Charles William Stearns, New Berlin, WI (US); David Leo McDaniel, Dousman, WI (US); John Jay Williams, Hartland, WI (US); Alexander Ganin, Whitefish Bay, WI (US); Ravindra Mohan Manjeshwar, Guilderland, NY (US); Floribertus Philippus Martinus Heukensfeldt Jansen, Ballston Lake, NY (US); Yiping Shao, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 218 days.

(21) Appl. No.: 11/026,236

(22) Filed: Dec. 30, 2004

(65) Prior Publication Data

US 2006/0145082 A1     Jul. 6, 2006

(51) Int. Cl.
*G01T 1/164*     (2006.01)

(52) U.S. Cl. .......................... 250/363.03; 250/363.01; 250/363.02; 250/336.1; 250/361 R (58) Field of Classification Search ........... 250/363.02, 250/363.03, 363.04
See application file for complete search history.

(56) References Cited

U.S. PATENT DOCUMENTS

| | | | |
|---|---|---|---|
| 4,980,552 A | 12/1990 | Cho et al. | |
| 5,272,343 A | 12/1993 | Stearns | |
| 5,272,344 A | 12/1993 | Williams | |
| 6,232,604 B1 * | 5/2001 | McDaniel et al. | 250/363.03 |
| 6,376,841 B1 * | 4/2002 | Petrillo et al. | 250/363.03 |
| 6,852,978 B2 * | 2/2005 | Williams et al. | 250/363.03 |
| 7,030,382 B2 * | 4/2006 | Williams et al. | 250/363.03 |

OTHER PUBLICATIONS

A Mallon and P Grangeat, Three-dimensional PET reconstruction with time-of-flight measurement, 1992, Phys. Med. Biol., vol. 37, No. 3, pp. 717-729.*

* cited by examiner

*Primary Examiner*—David Porta
*Assistant Examiner*—Djura Malevic
(74) *Attorney, Agent, or Firm*—Dean D. Small; Small Patent Law Group (57) ABSTRACT

Methods and systems for controlling a positron emission tomography (PET) system are provided. The method includes receiving timing information from a PET system during an imaging scan using the PET system. The method further includes processing the received timing information and timing bias information relating to the PET system to control the PET system.

20 Claims, 5 Drawing Sheets

| | Time bias 0 ps | Time bias 0-250 ps | Time bias 250-500 ps | Time bias 500-750 ps |
|---|---|---|---|---|
| Images with timing bias | | | | |
| Images with timing bias correction | | | | |

FIG. 5

METHOD AND SYSTEM FOR POSITRON EMISSION TOMOGRAPHY IMAGE RECONSTRUCTION

BACKGROUND OF THE INVENTION

This invention relates generally to medical imaging systems, and more particularly, to image reconstruction using Positron Emission Tomography (PET).

PET generates images that represent the distribution of positron-emitting nuclides within the body of a patient. When a positron interacts with an electron by annihilation, the entire mass of a positron-electron pair is converted into two 511-keV photons. The photons are emitted in opposite directions along a line of response. The annihilation photons are detected by detectors that are placed on both sides of the line of response, in a configuration such as a detector ring. When these photons arrive and are detected at the detector elements at the same time, this is referred to as coincidence. An image is then generated based on the acquired image data that includes the annihilation photon detection information.

In PET scanners, the image quality depends on image statistics. The image statistics may be improved by acquiring the image data for longer durations. However, the total time of acquiring the image data is limited by the decay of radioactive isotope and by the inability of the patients to not move for extended durations.

Image quality may be improved by including time-of-flight (TOF) information for the image data. The TOF is the time taken by an annihilation photon to travel from the origin of annihilation to the detector along the line of response. TOF PET also uses the timing difference at which the photons are detected by the detector elements for the reconstruction of an image. If the distance between two detector elements P and Q is 2A and annihilation of a positron-electron pair occurs at the midpoint of the line joining the two detector elements, the time taken by each photon to reach the detector element is A/c, where c is the speed of light. In this case, the timing difference is zero. If the annihilation occurs at a distance x towards detector element P, the time taken by the photons to reach detector elements P and Q is (A−x)/c and (A+x)/c respectively. In this case, the timing difference is 2x/c, which may also be expressed as x/(c/2). The timing difference is used to reconstruct an image along the line joining two detector elements in TOF PET systems.

In order to maintain high resolution of images in the reconstruction process in TOF PET systems, it is typically important to measure the timing difference accurately. A systematic error, or bias, in the estimation of the timing difference between photon detection in the two detectors will translate into a shift of the estimated source of photon annihilation along the line joining two detector elements because calibration errors result in a timing bias. If the timing bias is 0.1 nanoseconds (ns), the reconstruction process shifts the data along the line between the detector elements by 1.5 cm. Such shifts make it difficult to achieve resolution of the order of 0.5 cm or better. Thus, high resolution image reconstruction of smaller objects (e.g., smaller anatomical structures) is difficult, if not impossible.

In known TOF PET systems, the timing difference is measured by determining the overlap of analog pulses representing the arrival time of the photons at the detector elements. The analog pulses are communicated through an AND gate to determine coincidence. Each individual detector element has its own set of electronics that is adjusted to remove the timing biases. However, the timing performance of each channel may drift or shift over time, for example, as the electronics used becomes warmer during longer operating periods. Therefore, it is difficult to tune or calibrate these systems to maintain the desired level of accuracy in reconstruction.

In other known TOF PET systems, the photon arrival time is digitized and coincidence is determined by comparing the digital time stamps for each measured photon. The system is tuned or calibrated by introducing a variable amount of delay in the signal before it is digitized in each detector element. However, a system with a large number of detector elements will, for reasons of economy of manufacture, use a common set of electronics to process a group of detector elements. It is commonly not known which detector within the group has received a photon, and therefore which value of the delay should be applied to the signal before the signal is digitized and processed. Therefore, differences in the timing bias among the detectors in a group cannot be individually corrected by adjusting the electronics as described above, and, if these differences are significant, there will be a loss of accuracy in the reconstructed image.

Another known method of tuning a TOF PET system is to introduce a delay after the signal is digitized by changing the digital time stamp. In this case, the timing signal from each individual detector element can only be adjusted in multiples of the LSB, even though the system may have the capability to determine that the timing is some fraction of the LSB. The adjustment can reduce the timing bias to only ±½ LSB. Because this occurs for each of the two photons in the coincidence pair, the timing bias for the coincidence pair may be as large as ±1 LSB. For example, if the LSB is 500 picoseconds (ps), it corresponds to a location error of up to ±3.75 cm along the coincidence line of response. This makes it difficult, if not impossible, to achieve sub-centimeter resolution in a TOF PET system.

BRIEF DESCRIPTION OF THE INVENTION

In one embodiment of the invention, a method for controlling a positron emission tomography (PET) system is provided. The method includes receiving timing information from a PET system during an imaging scan using the PET system. The method further includes processing the received timing information and timing bias information relating to the PET system to control the PET system.

In another embodiment of the invention, a PET system is provided. The PET system includes a plurality of detector elements for performing a PET scan. The PET system further includes a processor configured to process timing bias information and received scan information from the detector elements. The received scan information includes timing information. The processor is further configured to reconstruct an image of an object scanned by the PET system based on the timing bias information and the received scan information.

DETAILED DESCRIPTION OF THE INVENTION

Various embodiments of the invention provide a method and a system for controlling a positron emission tomography (PET) system.

Figure 1:
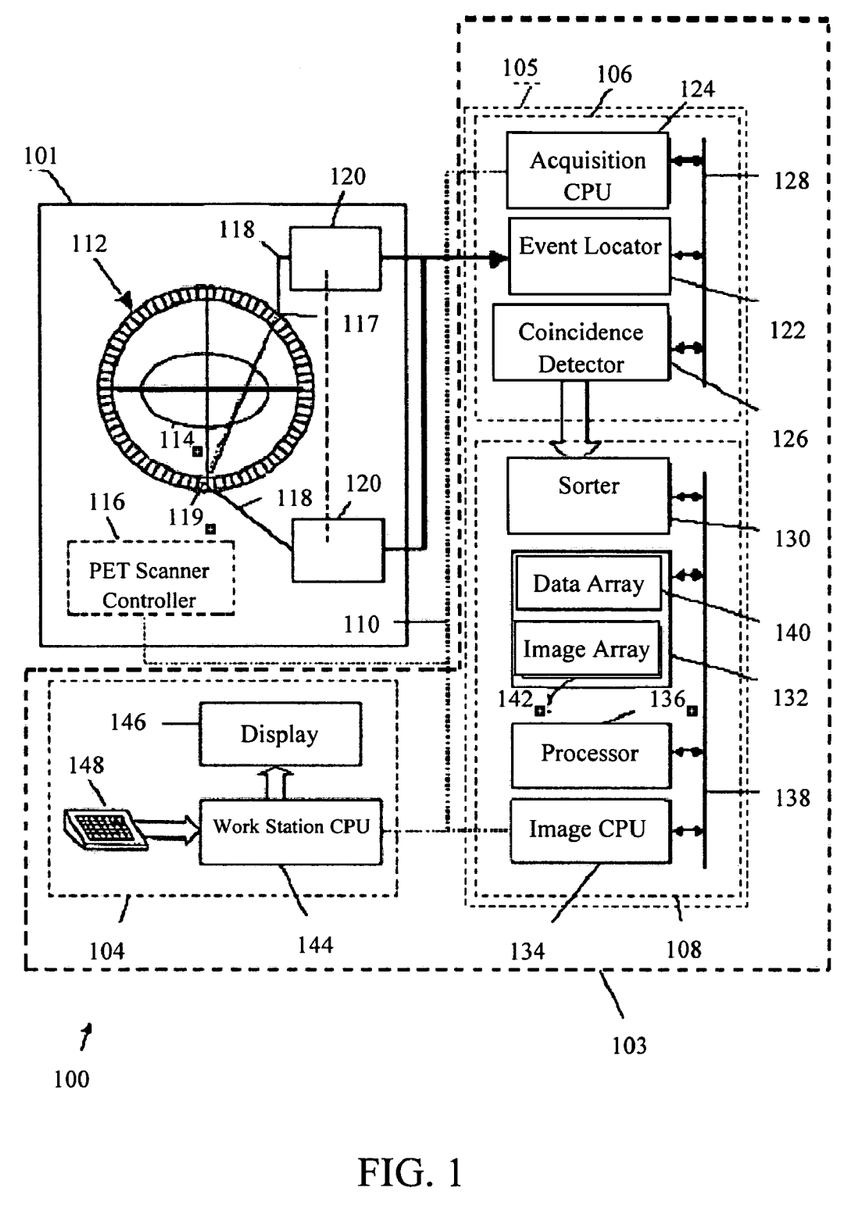
FIG. 1 is a block diagram illustrating a positron emission tomography (PET) system constructed in accordance with an exemplary embodiment of the invention.

FIG. 1 is a block diagram of an exemplary embodiment of a PET system 100 in which various embodiments of the invention may be implemented. PET system 100 includes a PET scanner 101 and a controller 103 to control normalization and image reconstruction processes. Controller 103 is also configured to correct losses in the normalization process due to dead time in the detector blocks of PET scanner 101. The correction is performed using the various embodiments described herein. Controller 103 includes an operator workstation 104, and a processor 105. Processor 105 includes a data acquisition processor 106 and an image reconstruction processor 108. PET scanner 101, operator workstation 104, data acquisition processor 106 and image reconstruction processor 108 are interconnected via a communication link 110 (e.g., a serial communication or wireless link). PET scanner 101, which typically includes a gantry (not shown), acquires scan data and transmits the data to data acquisition processor 106. The operation of PET scanner 101 is controlled from operator workstation 104. The data acquired by data acquisition processor 106 is reconstructed using a reconstruction processor 108.

PET scanner 101 may operate using, for example, a plurality of detector rings. One such detector ring, detector ring 112, is illustrated in FIG. 1. Detector ring 112 includes a central opening, in which an object 114 (e.g., a patient) may be positioned, using, for example, a motorized table, that is aligned with the central axis of detector ring 112. This motorized table moves object 114 into the central opening of detector ring 112 in response to one or more commands received from operator workstation 104. A PET scanner controller 116, also referred to as a gantry controller, is provided (e.g., mounted) within PET scanner 101. PET scanner controller 116 responds to the commands received from operator workstation 104 through communication link 110. Therefore, the operation of PET scanner 101 is controlled from operator workstation 104 through PET scanner controller 116.

Detector ring 112 includes a plurality of detector elements 117 for performing a PET scan of object 114. For example, in the GE Discovery™ ST PET system, there are 420 crystals per ring, and 24 rings in the scanner. As shown in FIG. 1, detector ring 112 includes a detector element 117, a detector element 119, and several other detectors. Detector element 117, like the other detectors, includes a set of scintillator crystals arranged in a matrix that is disposed in front of a plurality of photomultiplier tubes (e.g., four tubes). When a photon collides with a crystal on a detector, it produces a scintilla on the crystal. Each photomultiplier tube produces an analog signal on communication line 118 when a scintillation event occurs. A set of acquisition circuits 120 is provided within PET scanner 101 to receive these analog signals. Acquisition circuits 120 produce digital signals indicating the 3-dimensional (3D) location and total energy of the event. Acquisition circuits 120 also produce an event detection pulse, which indicates the time or moment the scintillation event occurred. These digital signals are transmitted through a communication link, for example, a cable, to an event locator circuit 122 in data acquisition processor 106.

Data acquisition processor 106 includes event locator 122, an acquisition CPU 124 and a coincidence detector 126. Data acquisition processor 106 periodically samples the signals produced by acquisition circuits 120. Acquisition CPU 124 controls communications on a back-plane bus 128 and on communication link 110. Event locator circuit 122 processes the information regarding each valid event and provides a set of digital numbers or values indicative of the detected event. For example, this information indicates when the event took place and the position of the scintillation crystal that detected the event. An event data packet is communicated to coincidence detector 126 through back-plane bus 128. Coincidence detector 126 receives the event data packets from event locator circuit 122 and determines if any two of the detected events are in coincidence. Coincidence is determined by a number of factors. First, the time markers in each event data packet must be within a predetermined time period, for example, 12.5 nanoseconds, of each other. Second, the LOR formed by a straight line joining the two detectors that detect the coincidence event should pass through the field of view in PET scanner 101. Events that cannot be paired are discarded. Coincident event pairs are located and recorded as a coincidence data packet that is communicated through a communication link to a sorter 130 in image reconstruction processor 108.

Image reconstruction processor 108 includes sorter 130, a memory module 132, an image CPU 134, an array processor 136 and a back-plane bus 138. Sorter 130 counts all events occurring along each projection ray and organizes them into 3D data. This 3D data (or sinograms) is organized in one exemplary embodiment as a data array 140. Data array 140 is stored in memory module 132. Back-plane bus 138 is linked to communication link 110 through image CPU 134. Image CPU 134 controls communication through back-plane bus 138. Array processor 136 is also connected to back-plane bus 138. Array processor 136 receives data array 140 as an input and reconstructs images in the form of image arrays 142. Resulting image arrays 142 are stored in memory module 132.

The images stored in image array 142 are communicated by image CPU 134 to operator workstation 104. Operator workstation 104 includes a CPU 144, a display device 146 and an input device 148. CPU 144 connects to communication link 110 and receives inputs (e.g., user commands) from input device 148. Input device 148 may be, for example, a keyboard, mouse, or a touch-screen panel. Through input device 148 and associated control panel switches, the operator can control the calibration of PET scanner 101, the configuration of PET scanner 101, and the positioning of object 114 for a scan. Input device 148 can also control the processing performed by image CPU 134 by specifying, for example, the filters and processing methods used in the reconstruction. Similarly, the operator can control the display of the resulting image on display device 146 and perform image-enhancement functions using programs executed by workstation CPU 144.

Processor 105 is configured to process the scan information received from detector elements 117. The scan information includes, for example, image and timing information that is received by processor 105 from detector elements 117 during an imaging scan. The timing information in one embodiment is the difference in time at which two photons emitted in a photon event are detected by detector elements 117. The timing information may include time stamp information relating to a measured photon event detected by a pair of detector elements 117 for PET system 100. Time stamp information is the time at which each photon is detected by detector element 117. Further, processor 105 is configured to process the timing bias information as described in more detail herein. Timing bias is an error in the timing data due to, for example, the digitizing of the timing signal with a certain quantization level referred to as the Least Significant Bit (LSB). Timing bias also may be due to residual timing errors. The residual timing errors may result from, for example, some detector elements being located at the top of the detector element ring and other detector elements being located at the bottom of the detector element ring, with the electronic control equipment located closer to the bottom of the ring than to the top. Therefore, the detector elements at the top of the ring include a longer control or communication cable than the detector elements at the bottom of the ring. This results in a bias in the time at which the photons are detected.

Figure 2:
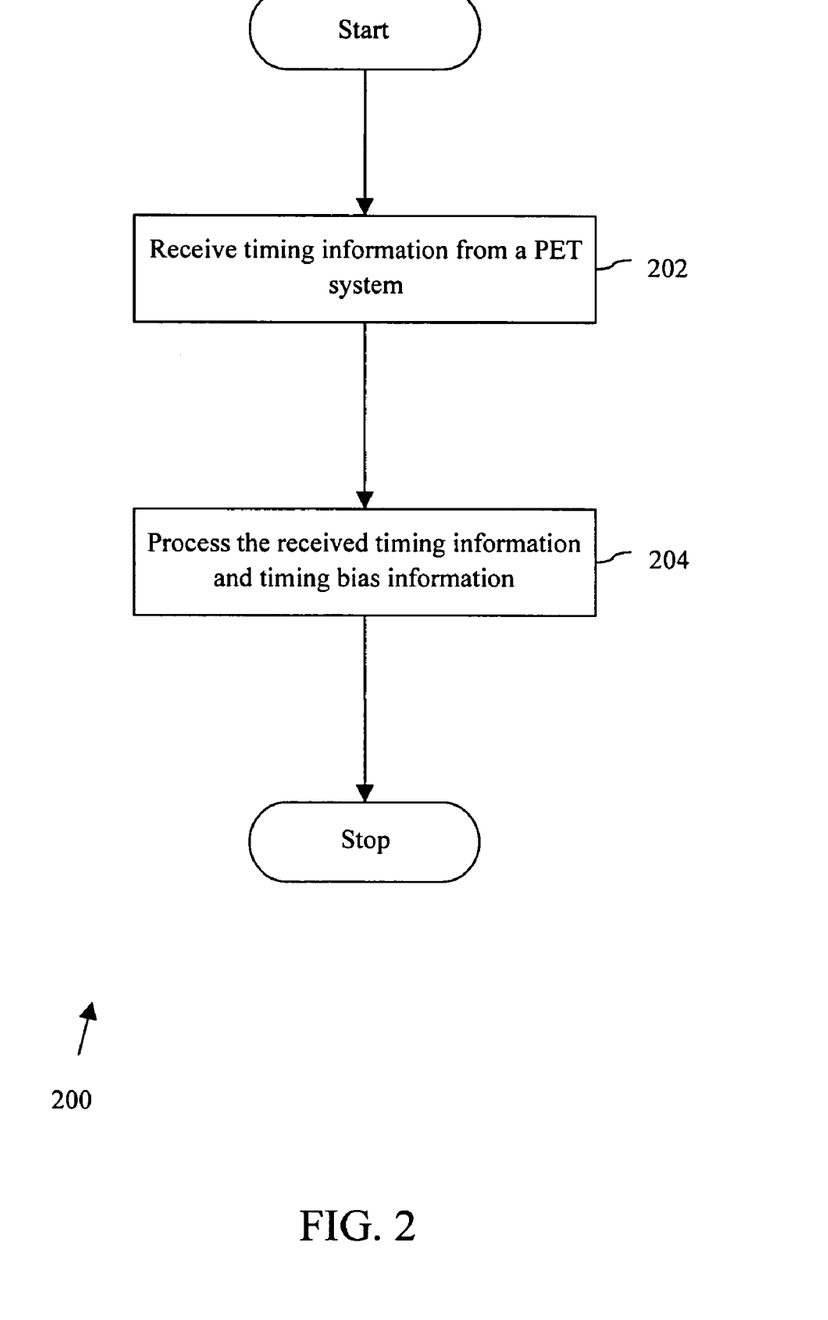
FIG. 2 is a flowchart illustrating a method for controlling a PET system in accordance with an exemplary embodiment of the invention.

FIG. 2 is the flowchart illustrating a method 200 for controlling PET system 100 in accordance with an exemplary embodiment of the invention. At 202, processor 106 (shown in FIG. 1) receives or acquires timing information from PET system 100 during an imaging scan using PET system 100 as is known. The received timing information and timing bias information relating to PET system 100 are processed at 204 to control PET system 100 when reconstructing an image.

The timing information is received by detectors, which include, for example, a block of thirty-six scintillator crystals attached to a 4-channel photomultiplier tube (PMT). The scintillator crystals convert the incoming photon from the patient into a plurality (e.g., several thousand) of light photons (e.g., visible or near UV), which are detected by the PMT(s). The proportion of light photons detected by each PMT channel is used to determine which of the 36 crystals received the incoming photon. The timing signal is determined by processing the leading edge of the PMT signals to estimate the arrival time of the light photons at the PMTs. This timing signal is then digitized and processed subsequently.

The timing information and the timing bias information are used to reconstruct an image of object 114 scanned by PET system 100. The reconstruction may include, for example, a two-dimensional reconstruction or a three-dimensional reconstruction. The timing bias information may include average timing bias information relating to detector elements 117 in PET system 100. The timing bias information for each detector element 117 is configured as a timing bias matrix having a timing bias value for each of a set of projection rays for PET system 100. It should be noted that the projection rays from a photon event are detected by a detector element pair. The timing bias information for each detector element pair corresponding to the projection ray is stored in a memory of the PET system, for example, a TOF PET system.

Figure 3:
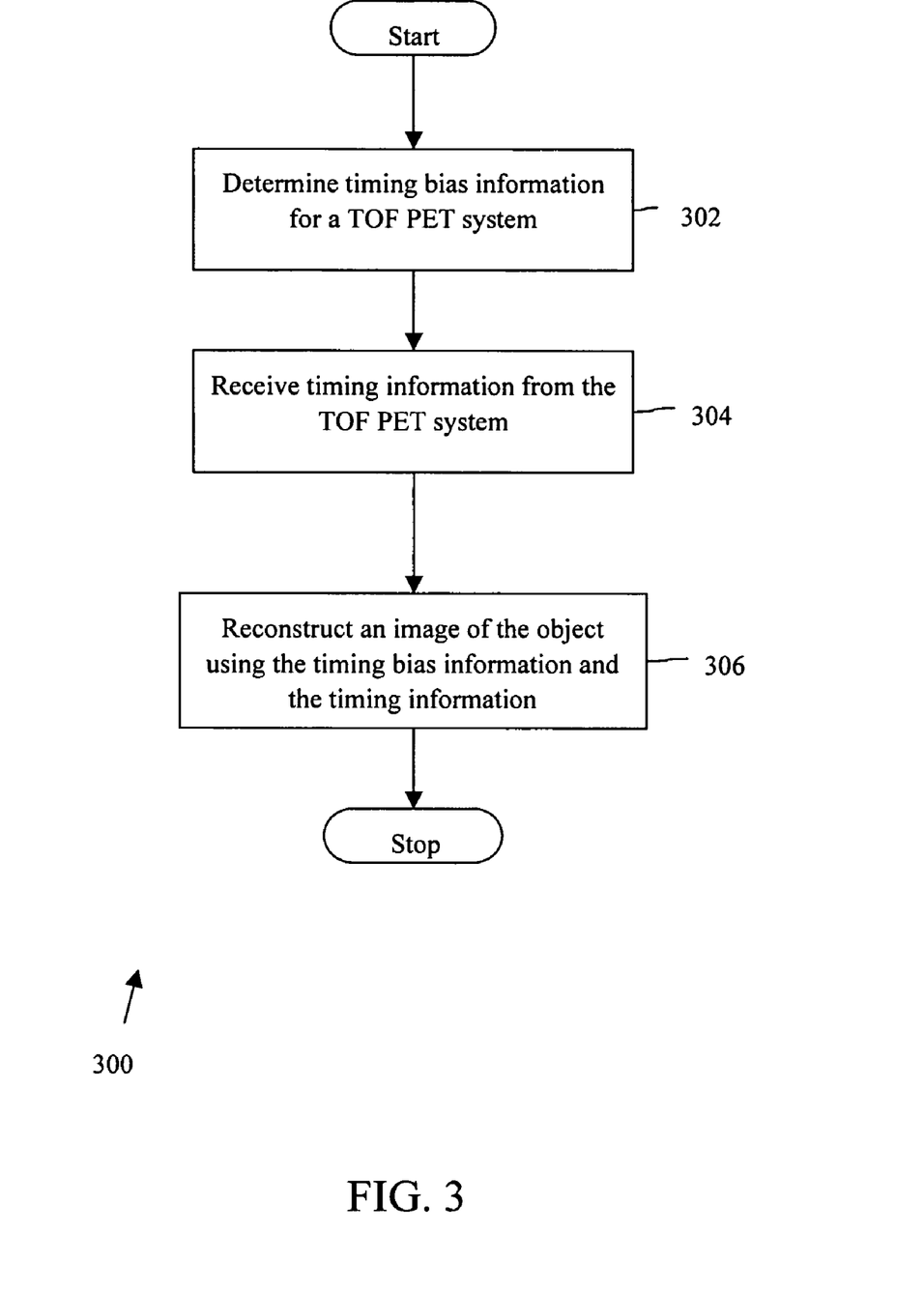
FIG. 3 is a flowchart illustrating a method for performing image reconstruction in a time-of-flight positron emission tomography (TOF PET) system in accordance with an exemplary embodiment of the invention.

FIG. 3 is a flowchart illustrating a method 300 for performing image reconstruction in a TOF PET system in accordance with an exemplary embodiment of the invention. The timing bias information for the TOF PET system is determined at 302. Timing information is received at 304 from the TOF PET system, during an image acquisition scan of an object using the TOF PET system as is known. Based on the received timing bias information and the timing information, an image of the object is reconstructed at 306.

The determination of timing bias information includes measuring timing differences for detector elements 117 within the TOF PET system. Measuring the timing differences includes performing a calibration scan for each of the detector elements 117 that are used to calibrate PET system 100.

Image reconstruction processor 108 determines the timing bias for each detector element 117 by performing a Fourier transform on the data from each of detector elements 117 and multiplying it by a one-dimensional filter array. The filtered data is then inverse Fourier transformed, and each array element is back projected to obtain the timing bias for each detector element 117. The timing bias for each detector element pair is then determined by the vectorial addition of the individual timing biases for the pair. For example, for a pair of detector elements including detector element 117 and detector element 119, if the coincidences of detector element 117 are, on an average, 100 ps and that of detector element 119 are, on an average, 200 ps, then there is a timing bias of 100 ps towards detector element 119. It should be noted that the detector elements are referred to as detector element 117 and detector element 119 only to differentiate their location in detector ring 112. However, with respect to functionality, detector elements 117 and 119 are the same. The timing bias for a pair of detector elements 117 and 119 is the sum of the individual biases of the two detector elements. A timing bias matrix $B(r, \theta)$ is generated based on the timing bias information for all the detector element pairs. The timing bias information of all the detector element pairs is used to configure the timing bias matrix.

In the reconstruction of an image, the timing biases for the detector element pairs are used to determine the point along a line joining a pair of detector elements at which a photon event occurred. For example, from the timing bias matrix, it may be determined that the timing bias in a detector element pair is 200 ps towards detector element 117. Using a conversion factor of 15 cm/ns, which is half the speed of light (half the speed of light is used because two photons are traveling in opposite direction simultaneously), the 200 ps timing bias is equivalent to a distance of 3 cm. Therefore, if there is a photon event with a timing difference of zero, this generally indicates that the photon event occurred at the midpoint of the line joining the two detector elements. However, because of the timing bias in the detector element pair towards detector element 117, the zero time stamp data that the photon event occurred at a point 3 cm towards detector element 117.

There are two main types of image reconstruction algorithms, as are known, that can be used to reconstruct an image in a TOF PET system, analytical image reconstruction, (e.g., confidence-weighted filtered back projection) and iterative reconstruction, (e.g., confidence-weighted maximum-likelihood expectation maximization). Both of these algorithms for image reconstruction are based on the fundamental operation of back-projection, which converts the counts detected by a detector pair/time bin combination back into the image space. This is performed by smearing the counts (in appropriate proportions) at the appropriate location (as determined by the time bin) along the line joining the two detector elements 117 and 119. It should be noted that any reconstruction algorithms may be used of the ones described herein, modified as desired or needed. It further should be noted that in an embodiment, the TOF PET system includes multiple timing bins, each corresponding to a different measured timing difference. Each time bin represents a different location on the line joining two detector elements 117 and 119. The bin representing time t=0 represent the midpoint between two detector elements 117 and 119. The bins with positive time stamps are located towards one detector element while those with negative time stamps are located towards the other detector element.

In the reconstruction of an image, the bins are shifted along the line joining the two detector elements by an amount proportional to the timing bias in each of the detector element pairs. This is further described in connection with FIG. 4.

Figure 4:
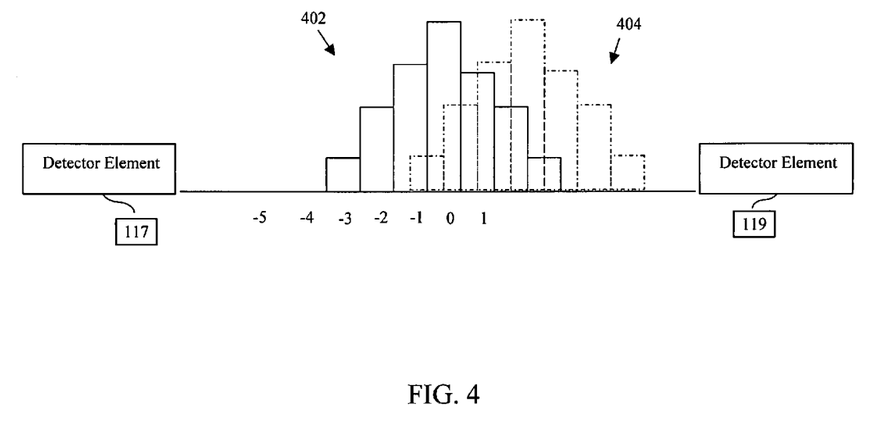
FIG. 4 is a diagram illustrating the application of timing bias information to the timing information in the reconstruction process in accordance with an exemplary embodiment of the invention.

FIG. 4 illustrates the application of timing bias information to timing information in a reconstruction process in accordance with an exemplary embodiment of the invention. Detector elements 117 and 119 form one of many detector element pairs in detector element ring 112 that determines coincidences. Bars 402 represent the timing information indicating the probability of a photon event occurring at different points along the line joining two detector elements 117 and 119. This probability data is then assembled with the timing bias information from the timing bias matrix for each detector element pair to shift the timing bins along the line joining the two detector elements 117 and 119, and as shown by dotted bars 404. As shown in FIG. 4, detector element 117 and detector element 119 are used to detect a photon event. It should be noted that the detector elements are referred to as detector element 117 and detector element 119 only to differentiate their location in FIG. 4. However, with respect to functionality, detector elements 117 and 119 are the same. If the timing bias in detector element pair is 3 cm towards detector element 119, bars 402 are shifted by 3 cm towards detector element 119. After shifting the timing bins, the appropriate pixels along the line joining the two detector elements are incremented, by known methods, to reconstruct a high-resolution image.

Figure 5:
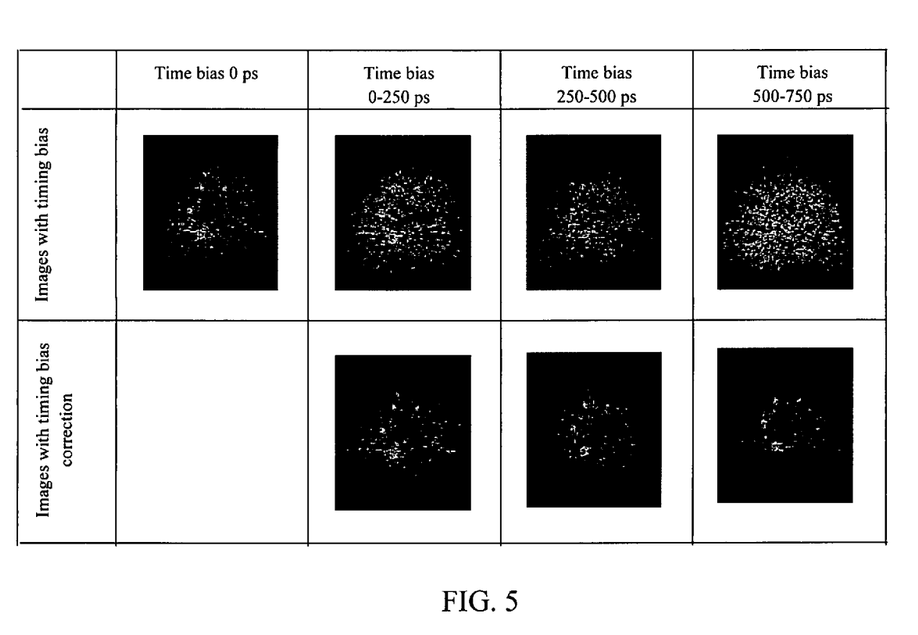
FIG. 5 illustrates images before and after timing bias correction.

FIG. 5 illustrates images before and after timing bias correction. The images in the top row are images in which timing bias correction is not incorporated. It can be seen that the areas in the image to be examined are not clear and it is difficult to distinguish between different regions. The second row, at the bottom, show the same images as in the top row with timing bias correction. It can be seen that the areas in the image to be examined are clear after timing bias correction and can be distinguished.

The various embodiments of the invention provide an image of higher resolution in the reconstruction process of a TOF PET system by incorporating timing bias information and timing information.

A technical effect of the various embodiments of the invention is to provide an image of high resolution in the reconstruction process of a TOF PET system by incorporating timing bias information and timing information.

The various embodiments or components of the present invention may be implemented as part of a computer system. The computer system may include a computer, an input device, a display unit and an interface, for example, for accessing the Internet. The computer may include a microprocessor. The microprocessor may be connected to a communication bus. The computer may also include a memory. The memory may include Random Access Memory (RAM) and Read Only Memory (ROM). The computer system further may include a storage device, which may be a hard disk drive or a removable storage drive such as a floppy disk drive, optical disk drive, and the like. The storage device can also be other similar means for loading computer programs or other instructions into the computer system.

As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer system executes a set of instructions that are stored in one or more storage elements, in order to process input data. The storage elements may also hold data or other information as desired or needed. The storage element may be in the form of an information source or a physical memory element within the processing machine.

The set of instructions may include various commands that instruct the processing machine to perform specific operations such as the processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

While the invention has been described in terms of various specific embodiments, those skilled in the art will recognize that the invention can be practiced with modification within the spirit and scope of the claims.

What is claimed is:

1. A method for controlling a positron emission tomography (PET) system defining multiple time bins associated with a pair of detector elements, the time bins representing different locations along a line between the detector elements, said method comprising:

receiving timing information, the timing information including a timing bias correction, from a PET system during an imaging scan using the PET system; and processing the received timing information and timing bias information relating to the PET system to control the PET system to correct timing differences between the detector elements by shifting the time bins along the line joining the detector elements by an amount proportional to the timing bias.

2. A method in accordance with claim 1 further comprising reconstructing an image of an object scanned by the PET system using the received timing information and the timing bias information.

3. A method in accordance with claim 2 wherein the reconstructing comprises performing one of a two-dimensional and a three-dimensional reconstruction.

4. A method in accordance with claim 2 wherein the reconstructing comprises at least one of a back projection and a forward projection process.

5. A method in accordance with claim 1 further comprising performing a calibration scan to obtain the timing bias information.

6. A method in accordance with claim 1 wherein the timing bias information is configured as a timing bias matrix.

7. A method in accordance with claim 1 wherein the timing bias information is configured as a timing bias matrix having a timing bias value for each of a set of projection rays for the PET system.

8. A method in accordance with claim 1 wherein the timing bias information comprises determined residual timing error information.

9. A method in accordance with claim 1 wherein the timing bias information comprises average timing bias information relating to detector elements in the PET system.

10. A method in accordance with claim 1 wherein the timing information comprises time stamp information relating to a measured photon event for the PET system.

11. A method in accordance with claim 1 wherein the PET system comprises a time-of-flight PET (TOF PET) system.

12. A method for performing image reconstruction in a time-of-flight positron emission tomography (TOE PET) system, said method comprising:
   determining timing bias information for a TOE PET system;
   receiving timing information from the TOE PET system during an image acquisition scan of an object using the TOE PET system that includes timing bins associated with detector elements; and
   reconstructing an image of the object using the timing bias information to shift the timing bins to determine a point on a line joining a pair of detector elements where the photon event occurred.

13. A method in accordance with claim 12 wherein the determining comprises measuring timing differences for detector elements within the TOF PET system.

14. A method in accordance with claim 13 wherein the measuring comprises performing a calibration scan to determine timing bias values for each of the detector elements.

15. A method in accordance with claim 12 further comprising generating a timing bias matrix based on the riming bias information.

16. A method in accordance with claim 12 wherein the timing bias information comprises a timing bias value for each of a set of projection rays of the TOF PET system.

17. A method in accordance with claim 12 wherein the timing information comprises time stamp information relating to a measured photon event for the TOE PET system.

18. A positron emission tomography (PET) system including timing bins associated with detector elements, comprising:
   a plurality of detector elements for performing a PET scan to acquire a plurality of projection rays from a photo event, each projection ray having timing bias information;
   memory to store a timing bias matrix configuration having a timing bias value for each set of projection rays detected by a detector element pairs; and
   a processor configured to process timing bias information and received scan information from the detector elements, the received scan information including timing information, and to reconstruct an image of an object scanned by the PET system using the timing bias value to shift timing bins to correct for a point on a line joining a pair of detectors elements where the photon event occurred.

19. A PET system in accordance with claim 18 wherein the timing bias information is acquired during a calibration scan and comprises a timing bias value for each of a set of projection rays of the PET system.

20. A PET system in accordance with claim 18, wherein the timing bias correction comprises, shifting the bias along the line joining the detector elements by an amount proportional to the timing bias.

* * * * *